United States Patent
Buchnik et al.

(10) Patent No.: US 9,917,777 B2
(45) Date of Patent: Mar. 13, 2018

(54) METHOD AND SYSTEM FOR DECENTRALIZED WORKLOAD OPTIMIZATION IN A DATA PACKET PROCESSING SYSTEM USING A MULTICORE CPU

(71) Applicant: Wind River Systems, Inc., Alameda, CA (US)

(72) Inventors: Erez Buchnik, Alameda, CA (US); Jeff Mandin, Alameda, CA (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 405 days.

(21) Appl. No.: 14/597,829

(22) Filed: Jan. 15, 2015

(65) Prior Publication Data

US 2015/0200854 A1  Jul. 16, 2015

Related U.S. Application Data

(60) Provisional application No. 61/927,731, filed on Jan. 15, 2014.

(51) Int. Cl.

| | |
|---|---|
| G06F 15/16 | (2006.01) |
| H04L 12/801 | (2013.01) |
| G06F 11/07 | (2006.01) |
| G06F 9/50 | (2006.01) |
| G06F 15/80 | (2006.01) |

(52) U.S. Cl.
CPC .......... *H04L 47/10* (2013.01); *G06F 11/0724* (2013.01); *G06F 9/5077* (2013.01); *G06F 9/5083* (2013.01); *G06F 15/80* (2013.01)

(58) Field of Classification Search
CPC ...... H04L 47/10; G06F 11/0724; G06F 15/80; G06F 9/5083
See application file for complete search history.

(56) References Cited

U.S. PATENT DOCUMENTS

| | | | | |
|---|---|---|---|---|
| 2002/0152305 A1* | 10/2002 | Jackson | .................. | H04L 12/26 709/224 |
| 2012/0266179 A1* | 10/2012 | Osborn | .................. | G06F 9/5077 718/105 |
| 2015/0016266 A1* | 1/2015 | Dumitrescu | .......... | H04L 47/623 370/236 |

* cited by examiner

*Primary Examiner* — Yves Dalencourt
(74) *Attorney, Agent, or Firm* — Fay Kaplun & Marcin, LLP (57) ABSTRACT

A system and method for dynamically processing data across a plurality of processor cores in a multi-core computing environment for breaking down incoming data traffic into a plurality of segments and dynamically distribute and re-distribute the segments on an ongoing basis so as to allocate the handling of data traffic in a resource efficient manner.

16 Claims, 5 Drawing Sheets

METHOD AND SYSTEM FOR DECENTRALIZED WORKLOAD OPTIMIZATION IN A DATA PACKET PROCESSING SYSTEM USING A MULTICORE CPU

This application claims priority to U.S. Provisional Patent Application Ser. No. 61/927,731, filed Jan. 15, 2014, the entire contents of which are hereby incorporated by reference herein.

RELATED FIELD

The present application relates generally to processing of data packets in a computer network. More particularly, some embodiments relate to a method and system for dynamically distributing data packets based on traffic load.

BACKGROUND

Demand for network connectivity has been rapidly increasing. Data traffic across a computer network can be processed by a plurality of processors to distribute the load. Conventional methods for distributing data packets have relied on static mechanisms and do not adapt to changes in the amount of traffic. For example, the Intel® 82599 10 GbE Controller relies on fixed methods for distributing data packets, such as a Flow Director method, without any ability to adapt to changing traffic behavior. (See http://www.intel.com/content/www/us/en/ethemet-controllers/82599-10-gbe-controller-datasheet.html). The Flow Director method assigns rigid rules that direct specific data types to specific data queues for processing. The Flow Director may filter data packets based on the contents of and/or identifying information associated with the data packets such as, for example, VLAN header, source IP and destination IP address, source port and destination port numbers, Ipv4/Ipv6 and UDP/TCP or SCTP protocol match, a flexible 2-byte tuple anywhere in the first 64 bytes of the packet, or target pool number. However, none of these factors are dependent on the changing levels of data traffic or the amount of workload that is currently being handled by each processor. This inability to adapt to changing levels of data traffic results in inefficient use of resources, wasted processing power, and prematurely requiring use of additional capacity of systems.

As the demand for network usage increases, there is a need to expand capacity, consolidate systems, and reduce costs. One possible solution for addressing increased workloads is to assign multiple processor cores to perform a certain task, but this raises the challenge of seamlessly migrating an existing task, which was designed for a single processor core, onto multiple processor cores, without encountering performance degradation or other issues. It is therefore desirable to provide a method and system for processing data packets in a computer network that adapts to the changing needs of the data traffic and provides improved processing efficiency.

SUMMARY

In accordance with the foregoing objectives and others, one exemplary embodiment provides a system and method for dynamically rebalancing a multi-core computing system. In particular, the system includes a first and a second processor core. First, the method selects a first traffic segment configured to be processed by the first processor core. The first processor core has a first initial workload. The method then reassigns the first traffic segment to be processed by the second processor core if the predicted increased workload of the second processor core upon receipt of the first traffic segment would not exceed a first workload level. The method further determines whether the predicted reduced workload of the first processor core, subsequent to the transferring step, would be above, at or below a second workload level. In a particular embodiment, the first initial workload is above an upper threshold value corresponding to an excessively high processing load, and more particularly, the first and second workload levels may both correspond to an optimal workload level. In another embodiment, the first initial workload is below a lower threshold value corresponding to an excessively low processing load, and more particularly, the first workload level is an optimal workload level, and the second workload level is zero. In some embodiments, the method may also select a second traffic segment configured to be processed by the first processor core and repeats the transferring and determining steps for the second traffic segment if the reduced workload is above the second workload level. In other embodiments, the method may inactivate the first processor core if the reduced workload is at zero.

Another exemplary embodiment provides a system and method for dynamically processing data across a plurality of processor cores in a computing system. First, the method distributes a plurality of traffic segments across the plurality of processor cores. Each of the plurality of traffic segments corresponds to a subset of incoming data received by the computing system. Next, the method executes the plurality of traffic segments via the plurality of processor cores. The method then determines whether an aggregation of optimization counters exceeds a predetermined threshold. In some embodiments, one optimization counter per traffic segment corresponds to a number of computing cycles, and represents the processing workload consumed by the processor core that executes this traffic segment. The method further re-distributes the plurality of traffic segments across the plurality of processor cores such that a workload of at least one of the processor cores is altered to approach a predetermined workload level, and resets the optimization counters for all the traffic segments if the aggregation of optimization counters exceeds the predetermined threshold. In other embodiments, the predetermined workload level is an optimal workload level. In other embodiments, the predetermined workload level is zero.

DETAILED DESCRIPTION

The exemplary embodiments provide systems and methods for distributing data packets in a multi-core processing environment by dynamically adapting to the changing needs of incoming data traffic, and thereby reducing inefficient use of resources. For example, the systems and methods of the exemplary embodiments dynamically distribute incoming data packets across a plurality of processor cores such that performance of the system is linear with the total number of processor cores in operation, and is capable of withstanding changes in incoming data traffic load caused by individual users or sessions. Specifically, performance of the system is not heavily impacted by changes in data traffic load based on individual users or sessions. By not heavily impacted, it is meant that performance of the system, for example, packet delay, does not deviate from existing levels by more than 5%, typically, the packet delay does not deviate from existing levels by more than 1%, 2%, or 3%. In addition to improving system performance, dynamic distribution of incoming data packets according to the exemplary embodiments can consolidate processing data packets and isolate unused processor cores, thereby reducing power usage and/or making available resources for more efficient use, such as tasking the unused processor cores with data from other applications.

Generally, the methods and systems of the exemplary embodiments break down incoming data traffic into separate and discrete segments and dynamically distribute the segments on an ongoing basis so as to allocate the handling of data traffic across a multi-core processing environment in a resource-efficient manner. The segments may be distributed and subsequently reassigned in a manner that utilizes the optimal number of processor cores at any given time. In addition, to ensure seamless traffic-segment reassignment and to ensure that a traffic segment's data is processed in order of packet arrival, the methods and systems further include a mechanism for transfer of residual data packets to a newly assigned processing core while preventing re-ordering of data packets during transition periods.

The exemplary embodiments may be further understood with reference to the following description of exemplary embodiments and the related appended drawings, wherein like elements are provided with the same reference numerals.

Figure 1:
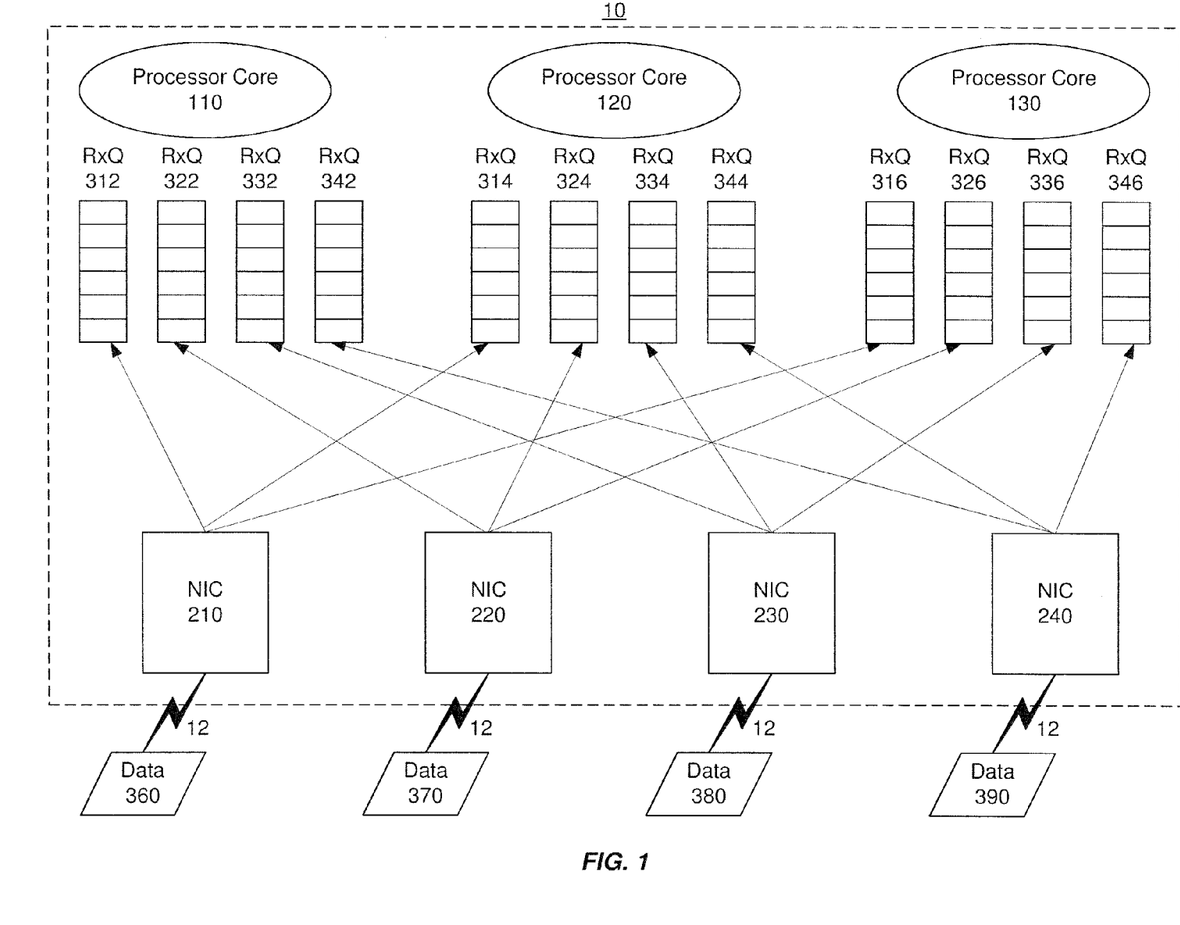
FIG. 1 shows an exemplary embodiment for a system for dynamically processing data packets across a plurality of processor cores in a multi-core processing environment.

An exemplary embodiment of a system 10 is shown in FIG. 1. The system 10 comprises a plurality of processor cores 110, 120, 130. The processor cores 110, 120, 130 may be individual microprocessors that are running in parallel as part of a single computing device, may be separate microprocessors that are part of separate computing devices, may be software processes acting as processor cores, or may be any other similar element capable of executing computing processes and requesting access to computing resources. That is, while the term processor core is used herein to describe the entity that is attempting to gain access to a computing resource, those skilled in the art will understand that the entity is not limited to a hardware processor core, but may include any number of execution threads that may request access to the computing resource. The processor cores 110, 120, 130 may be part of a multi-processor arrangement, such as, for example a multi-core processor or multiple threads executing on a single processor. While three processors cores are shown in the exemplary embodiment of FIG. 1, those skilled in the art will understand that the system 10 may include any suitable number (i.e., two or more) of processor cores. For example, the system 10 may include at least four (4) or at least eight (8) processor cores. In other exemplary embodiments, the system 10 may include 128 or more processor cores. In some embodiments, the system may include any suitable number of processor cores, but may activate and utilize only a portion of the available processor cores. In particular, the system may be selectively pre-configured such that only the active, participating processor cores are initialized for use (e.g., only the identities of the active, participating processor cores are pre-configured and initialized for data processing according to the exemplary embodiment). If the number or identities of the active processor cores need to change, the system 10 may be restarted to pre-configure a different set or number of active processor cores. Any of the active, participating cores may also optionally be temporarily inactivated (i.e., no traffic segment would be assigned to this core) as part of the pre-configuration or as the processor cores are being used. It is understood by those skilled in the art that the system 10 may include an increasing amount of processor cores to increase performance, e.g., rate of executing requests, of the system 10. In a particular exemplary embodiment, the system 10 may be configured to include a number of processor cores that is significantly lower than the number of traffic segments to be processed by the processor cores (e.g., 4 processor cores vs. 128 traffic segments), to allow sufficient granularity when reassigning traffic segments from one processor core to another. In another example, the number traffic segments are 1 or 2 orders of magnitude greater than the number of processor cores.

The system 10 also comprises a plurality of Network Interface Controllers (NIC) 210, 220, 230, 240 for receiving incoming data packets for execution by the plurality of processor cores 110, 120, 130. For example, as shown in FIG. 1, data flow 360 is received by NIC 210, data flow 370 is received by NIC 220, data flow 380 is received by NIC 230, and data flow 390 is received by NIC 240. However, it will be understood by those skilled in the art that each of the NICs is capable of receiving an ongoing stream of data and may be capable of receiving data from one or more sources. The NICs 210, 220, 230, 240 may receive incoming data flows 360, 370, 380, 390 respectively, via any suitable communication link 12, each of which may be independently selected from a wired (e.g., Ethernet, serial port, Universal Serial Bus, etc.) or wireless (e.g., Bluetooth, IEEE 802.1x, etc.) connection. It is noted that the NICs are capable of supporting data flows (e.g., packetized data) from one or more sources, such as virtual interfaces, file I/O or may even be randomly generated, and need not be uniform across the system 10. While a single incoming data flow 360, 370, 380, 390 is shown being transmitted via a communication link 12 to each one of NICs 210, 220, 230, 240 in the exemplary embodiment of FIG. 1, those skilled in the art will understand that each NIC may receive one or more data flows via one or more different types of communication links 12. The term NIC is used herein to describe any entity that receives data from a communications network and includes any suitable hardware, such as expansion cards for communication with the communications network, or circuitry within a device, such as a motherboard, that receives data from the communications network. However, those skilled in the art will understand that the entity is not limited to a hardware embodiment, but may include any number of software modules (e.g., virtual ports) that receive data from a communications network. While 4 NICs are shown in the exemplary embodiment of FIG. 1, those skilled in the art will understand that the system 10 may include any suitable number (i.e., one or more) of NICs. In some embodiments, the number of NICs may be the same as the number of processor cores. In other embodiments, the number of NICs may be less than the number of processor cores. For example, a system 10 comprising NICs with an increase in its throughput rate may be utilized in conjunction with a greater number of processor cores to provide additional resources for executing the increased throughput of incoming data. In another embodiment, the number of NICs is greater than the number of processor cores.

The data flows 360, 370, 380, 390 may be divided into a plurality of discrete Traffic Segments using any suitable means. The Traffic Segments correspond to a subset of data flows 360, 370, 380, 390 received at the NICs 210, 220, 230, 240. Each of the Traffic Segments may be the same or different in size. In one example, a Traffic Segment's size may be determined by a hash function on the source and destination IP addresses in an IP data packet header, i.e. the size of a Traffic Segment associated with a certain hash value corresponds to the number of all possible IP data packet headers that map to this hash value. Typically, the data flows 360, 370, 380, 390 are divided into 128 separate Traffic Segments. However, those skilled in the art will understand that each of the data flows 360, 370, 380, 390 may be divided into any suitable number of Traffic Segments, typically, the number of Traffic Segments is in power of 2 (e.g., 4, 8, 16, 32, 64, 128, 256, 512, 1024, etc.). The Traffic Segments may contain any suitable amount of data for execution by the processor cores 110, 120, 130. Those skilled in the art will understand that the Traffic Segments are not limited to any particular size, but may be any suitable size that allows for prompt execution by the processor cores 110, 120, and 130. The Traffic Segments are distributed across a plurality of Receiving Queues (RxQs) 312-346 for subsequent execution by the processor cores 110, 120, 130. Each RxQ is associated with a processor core such that data from the RxQ is directed to the associated processor core for execution. A single processor core may execute the data from each RxQ. In some embodiments, each processor core may be associated with one or more RxQs. In one exemplary embodiment, for a given configuration of the system 10, the number and mapping of Traffic Segments may be the same for all data flows 360, 370, 380, 390. In a particular embodiment, data from a particular Traffic Segment may be assigned entirely to a single processor core. For example, in system 10, if at a certain point in time a particular task or Traffic Segment from data flow 360 is assigned to processor core 120, then the portion of data in data flow 360 that is part of that same task or Traffic Segment may all be assigned for processing by processor core 120. Similarly, if a particularly task or Traffic Segment from data flow 370 is assigned to processor 120, then the portion of data in data flow 370 that is part of that same task or Traffic Segment may all be assigned for processing by processor 120.

In a particular embodiment, each RxQ is only permitted to receive Traffic Segments from a single NIC. Each processor core may be associated with at least one RxQ for each NIC present in the system. In one example, each processor core may be associated with a plurality of RxQs, the number of RxQs being the same as the total number of NICs in operation (e.g., not inactivated, or turned on, dedicated to use by the system) in the system. Accordingly, the total number of RxQs in the system may be equal to the total number of NICs present in the system multiplied by the total number of processor cores in operation in the system. It is noted that the total number of RxQs discussed above does not include any transitional queues, which are further discussed below.

For example, if there are two NICs in the system, each processor core is associated with two RxQs. In the exemplary embodiment shown in FIG. 1, each processor core 110, 120, 130 is associated with four RxQs, which corresponds to the number of NICs 210, 220, 230, 240 in the system 10. Specifically, processor core 110 is associated with RxQs 312, 322, 332, 342, processor core 120 is associated with RxQs 314, 324 334, 344, and processor core 130 is associated with RxQ 316, 326, 336, 346. As shown in FIG. 1, data flow 360 is received by NIC 210 and divided into a plurality of Traffic Segments that are distributed across RxQs 312, 314, 316. Similarly, data flow 370 is received by NIC 220 and divided into a plurality of Traffic Segments that are distributed across RxQs 322, 324, 326. Also, data flow 380 is received by NIC 230 and divided into a plurality of Traffic Segments that are distributed across RxQs 332, 334, 336. Further, data flow 390 is received by NIC 240 and divided into a plurality of Traffic Segments that are distributed across RxQs 342, 344, 346.

As shown in the exemplary embodiment illustrated in FIG. 1, each RxQ is processed by a single processor core, with each processor core being able to handle multiple RxQs. Each RxQ 312-346 receives data from only a single NIC 210, 220, 230 or 240. Thus, this particular embodiment includes a single RxQ associated with each processor core for receiving data from each NIC (e.g., 3 processor cores, 4 NICs, for a total number of 12 RxQs). Data flow 360 is received via a communications link 12 by NIC 210. Data flow 360 may be divided into a plurality of Traffic Segments that are initially evenly distributed across the processor cores 110, 120, 130. Specifically, the incoming data received by NIC 210 is distributed to RxQ 312, which is associated with processor core 110, RxQ 314, which is associated with processor core 120, and RxQ 316, which is associated with processor core 130. Similarly, data flow 370 received by NIC 220 is first divided and then distributed to RxQ 322, which is associated with processor core 110, RxQ 324, which is associated with processor core 120, and RxQ 326, which is associated with processor core 130. Data flow 380 received by NIC 230 is also divided and distributed to RxQ 332, which is associated with processor core 110, RxQ 334, which is associated with processor core 120, and RxQ 336, which is associated with processor core 130. Data flow 390 received by NIC 240 is also divided and distributed to RxQ 342, which is associated with processor core 110, RxQ 344, which is associated with processor core 120, and RxQ 346, which is associated with processor core 130.

Figure 2:
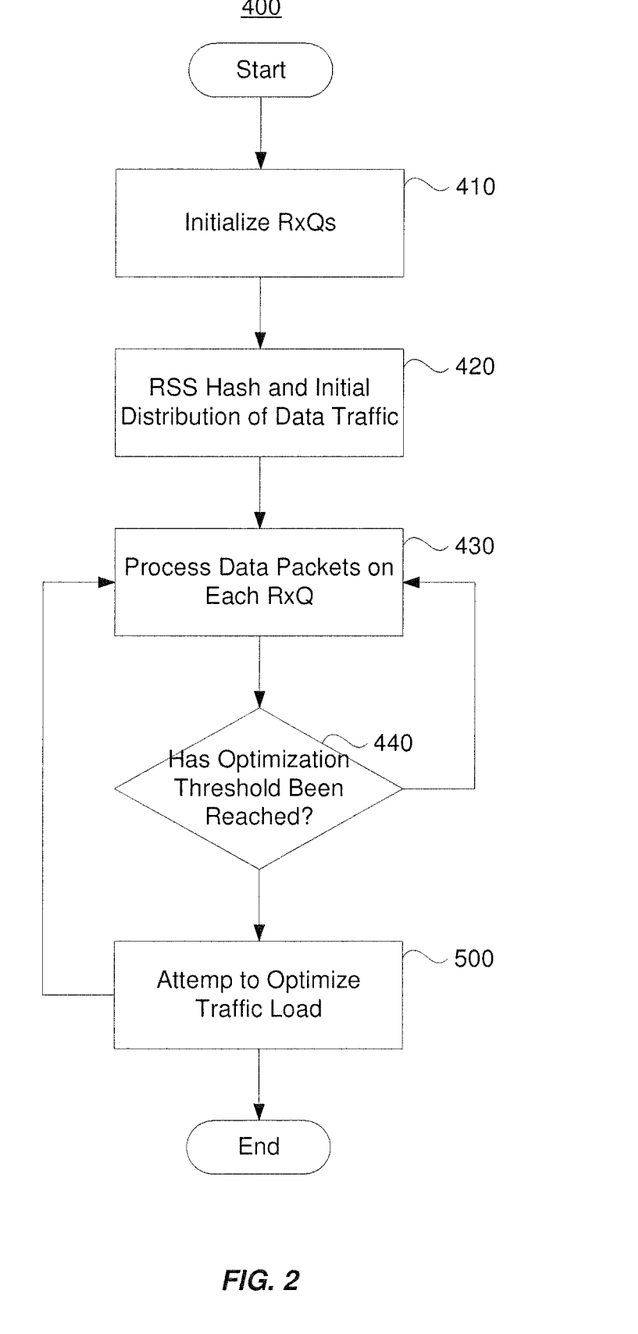
FIG. 2 shows an exemplary method for dynamically processing data packets across a plurality of processor cores in a multi-core processing environment.

FIG. 2 illustrates an exemplary method 400 for dynamically processing data packets across a plurality of processor cores in a multi-core processing environment. The method 400 described herein provides a decentralized optimization for distributing processing load across a plurality of processor cores. This decentralization method provides a more efficient method that consumes less computing resources and is less vulnerable to failures than centralized load balancing methods where the load balancing methods create a single bottleneck point for failure. The method 400 will be described with reference to the exemplary system 10 of FIG. 1; however, those of skill in the art will understand that this is only exemplary and that the method 400 may be implemented by various other systems as well. The exemplary method 400 as described further below minimizes the number of processor cores used for a particular workload, while maintaining the workload on each processor core below a predetermined threshold maximum level, typically at a desired optimal level.

In step 410, before the multi-core processing environment begins to receive and process data, a plurality of RxQs 312-346 may be initialized. For example, the initialization step may involve both the processor cores 110, 120, 130 and the NICs 210, 220, 230, 240, typically triggered by the processor cores. In one particular embodiment, each processor core may initialize those RxQs associated with it. For example, processor core 110 may initialize RxQs 312, 322, 332, 342, processor core 120 may initialize RxQs 314, 324, 334, 344, and processor core 130 may initialize RxQs 316, 326, 336, 346. The RxQs 312-346 may be initialized by any suitable means for queuing data packets for execution by processor cores 110, 120, 130. For example, the RxQs 312-346 may be initialized as individual modules on a computer readable medium, which may be part of a processor core, or be a part of a separate hardware entity attached to a processor core. In one exemplary embodiment of the initialization step 410, one of the processor cores (e.g., processor core 110, however, any other processor core may also serve this function) may first trigger initialization of NICs 210, 220, 230, 240, along with the corresponding transmitting sides of RxQs 312-346. Thereafter, processor core 110 may direct the remaining processor cores (e.g., processor cores 120, 130) to map the receiving sides of the appropriate RxQs. Subsequently, processor core 110 may map to the receiving sides of its own RxQs 312, 322, 332, 342.

In step 420, data flows 360, 370, 380, 390 are divided into a plurality of discrete Traffic Segments and initially distributed across RxQs 312-346. The data flows 360, 370, 380, 390 may be divided into a plurality of discrete Traffic Segments using any suitable means. In one embodiment, the data flows 360, 370, 380, 390 may be divided into discrete Traffic Segments using one or more hashing methods, flow directors, and/or filters that select for certain types of information or feature(s).

The data flows 360, 370, 380, 390 may be divided into discrete Traffic Segments using a hashing method. For example, the data flows 360, 370, 380, 390 may be divided into discrete Traffic Segments using a Receive Side Scaling (RSS) method. Specifically, a RSS method may perform an RSS hash calculation for each NIC to divide data flow received by the NIC into separate and discrete Traffic Segments. In one example, the RSS method is applied to each NIC in the system so that all of the incoming data flows are divided into discrete Traffic Segments for subsequent processing. By applying the RSS method to each and every NIC in the system, a greater number of Traffic Segments can be obtained and more efficient distribution of processing load may be achieved. In particular, the RSS method first performs an RSS hash calculation. The results of the RSS hash calculation are used as an index for separating the data flow into discrete Traffic Segments. More particularly, the data flow may be divided into Traffic Segments based on the particular values each subset of data generates in the RSS hash calculation. In a particular embodiment, the hash calculation provides a 32-bit result and divides each data flow 360, 370, 380, 390 into 128 Traffic Segments. An example of a RSS method for dividing data flow into discrete Traffic Segments is described in Intel® 82599 10 GbE Controller Datasheet, Chapter 7.1.2.8 et. seq, (available at http://www.intel.com/content/www/us/en/ethernet-controllers/82599-10-gbe-controller-datasheet.html), the entirety of the disclosures of which is incorporated herein by reference.

In one exemplary embodiment, data received by system 10 may have some additional contextual relationship but are provided to system 10 via separate data flows 360, 370, 380, 390. In this exemplary embodiment, the system 10 may detect this additional contextual relationship (e.g., data associated with a single task) and directed all data associated with this contextual relationship to be processed by the same processing core. In particular, data arriving on different data flows 360, 370, 380, 390, but have some contextual relationship at a higher level may be directed for processing in order together. For example, if system 10 is a network bridge, a TCP connection may be opened between a network element connected to NIC 210 and another network element connected to NIC 220. The RSS method may associate all packets belonging to this TCP connection to the same contextual relationship (and consequently process them in-sequence on the same processing core), not matter if the packets arrive at NIC 210 or at NIC 220.

Suitable filters may include L2 Ethertype filters (e.g., filters that identify and divide packets by their L2 Ethertype), L3/L4 5-tuple filters (e.g., filters that identify and divide data based on specific L3/L4 flows or sets of L3/L4 flows), TCP SYN filters (e.g., filters that identify packets that are flagged with an SYN flag). Those skilled in the art will understand that any hashing methods, flow directors, and/or filters maybe used to divide the data flows 360, 370, 380, 390 into discrete Traffic Segments. Further examples of such methods are provided in Intel® 82599 10 GbE Controller Datasheet, Chapter 7.1.2 et. seq.

The initial distribution of the Traffic Segments may be conducted via any suitable method. For example, the Traffic Segments may be initially distributed evenly across each of the processor cores 110, 120, 130, that is, each processor core receives the same number of Traffic Segments from each NIC. Specifically, the Traffic Segments may be divided across the processor cores 110, 120, 130 in a round-robin fashion (e.g., the first Traffic Segment is assigned to a RxQ associated with processor core 110, the second Traffic Segment is assigned to a RxQ associated with processor core 120, the third Traffic Segment is assigned to a RxQ associated with processor core 130, the fourth Traffic Segment is assigned to the RxQ associated with processor core 110, and so forth). Each of the NICs 210, 220, 230, 240 are configured so that the incoming data packets are initially mapped to RxQs associated with the processor cores 110, 120, 130 in the above-described manner.

In step 430, the data received in each RxQ is executed by its associated processor core. In one exemplary embodiment, each RxQ is associated with a Worker module. The Worker module may be implemented on any suitable computer readable medium and is configured to process data for execution by the associated processor core. The Worker function may also monitor (e.g., measuring and continuously updating the measurements per traffic segment) its own processing activity and share its activity information with a central repository. The central repository may be one or more computing modules, databases, or data arrays implemented on a computer readable medium, which may be part of or separate from its associated processor core. The Worker function may monitor, for example, processing load, available resources, number of processing cycles, etc.

In step 440, the method 400 determines whether an optimization threshold has been met to trigger rebalancing of processor workloads. It should be understood that the workload rebalancing process of step 500 (further described below) is not triggered after each computing cycle. Instead, step 440 periodically triggers the workload rebalancing process of step 500 at regular or irregular intervals. For example, step 440 triggers the workload rebalancing process of step 500 at regular intervals determined by the optimization threshold. In another example, the processor cores 110, 120, 130 trigger the workload rebalancing process of step 500 at staggered regular intervals determined by the optimization threshold. The optimization threshold may include any suitable criteria for triggering a rebalance of processor workloads. If the optimization threshold is triggered, then the method 400 proceeds to the workload optimization process of step 500. At the end of the workload optimization process of step 500, the method 500 returns to step 430 to continue to process and execute data from each RxQ. In one embodiment, the method 400 may terminate if data is no longer received by NICs 210, 220, 230, 240. In another embodiment, method 400 may continue to poll packets indefinitely, even if no data is received temporarily over the NICs 210, 220, 230, 240. If the optimization threshold is not triggered, the method 400 returns to step 430 to continue to process and execute data from each RxQ.

In one embodiment, the optimization threshold may be triggered by the expiration of a predetermined interval, for example, passage of a predetermined time interval since the previous rebalancing of workloads. For example, the optimization threshold may be monitored via a counter that measures amount of time or number of computing cycles since the system 10 was previously rebalanced by the workload optimization process of step 500. Specifically, the counter may be updated by step 500 after a rebalance event, e.g., when a Traffic Segment is redirected to be processed by a different processor core. More particularly, the counter may be reset (e.g., set to zero) upon completion of a rebalance event. In one example, step 440 determines whether a predetermined number of computing cycles have been conducted since the previous rebalance event. The number of computing cycles may be set by an operator or may be predetermined by the system 10 or each processor core. In some embodiments, the number of computing cycles may be adjusted by the system 10 or by each processor core, e.g., if the system 10 senses a change in traffic behavior that may result in reaching or exceeding an upper threshold value (further discussed below as "Black Watermark"), which corresponds to an excessively high level of processing load, sooner than the current number of remaining computing cycles before another rebalance event is triggered. The number of processing cycles may be 1 million cycles, 10 million cycles, 100 million cycles, or may any suitable number of cycles for triggering rebalancing of workloads. The counter may also store additional information regarding the previous rebalancing event such as, for example, the previous event's time stamp.

In an exemplary embodiment, step 440 also ensures that no more than one processor core attempts to rebalance workloads at the same time. In one embodiment, each processor core may be designated a separate timeslot for rebalancing its workload. For example, each timeslot is a small fraction of a predetermined interval that serves as the optimization threshold, and thus, upon triggering of the optimization threshold each processing core undergoes the workload optimization process of step 500 during its assigned timeslot until a rebalance event occurs. The counter may include the previous rebalance event's time stamp, which may be used to prevent other processor cores from initiating another rebalancing event until the optimization threshold is triggered again.

In a particular exemplary embodiment, the system 10 may be capable of completing all rebalancing procedures within 1 millisecond and resume rebalancing attempts after 10 milliseconds have elapsed since the last rebalance event. Each processor core may be assigned a distinct and designated time frame for rebalancing. For example, the system 10 may be configured so that processor core 110 would perform rebalancing attempts only within the first 1 millisecond after 10 milliseconds have elapsed from the last rebalance (i.e., between 10 milliseconds and 11 milliseconds after a previous rebalancing event), processor core 120 would perform rebalancing attempts only within the second 1 millisecond after 10 milliseconds have elapsed from the last rebalance (i.e., between 11 milliseconds and 12 milliseconds after a previous rebalancing event), processor core 130 would perform rebalancing attempts only within the third 1 millisecond after 10 milliseconds have elapsed from the last rebalance (i.e., between 12 milliseconds and 13 milliseconds after a previous rebalancing event), and then processor core 110 would again perform rebalancing attempts only within the fourth 1 millisecond after 10 milliseconds have elapsed from the last rebalance (i.e., between 13 milliseconds and 14 milliseconds after rebalancing), and so on. When any of the processor cores actually performs rebalancing, it updates the rebalance timestamp and workload counters so that another 10 milliseconds must pass before any of the processor cores would attempt rebalancing again. The system could also have a configurable limit for rebalancing attempts, which would force the rebalance timestamp and workload counters to be reset after a certain number of rebalancing event iterations have passed. This would allow the rebalancing logic to base on updated workload counts and therefore result in better rebalancing for the concurrent traffic situation. Also, the system 10 may optionally configure how often a processor core is permitted to attempt to rebalance within its own time-slot, so as to avoid workload peaks created by a high rate of rebalancing attempts.

Figure 3:
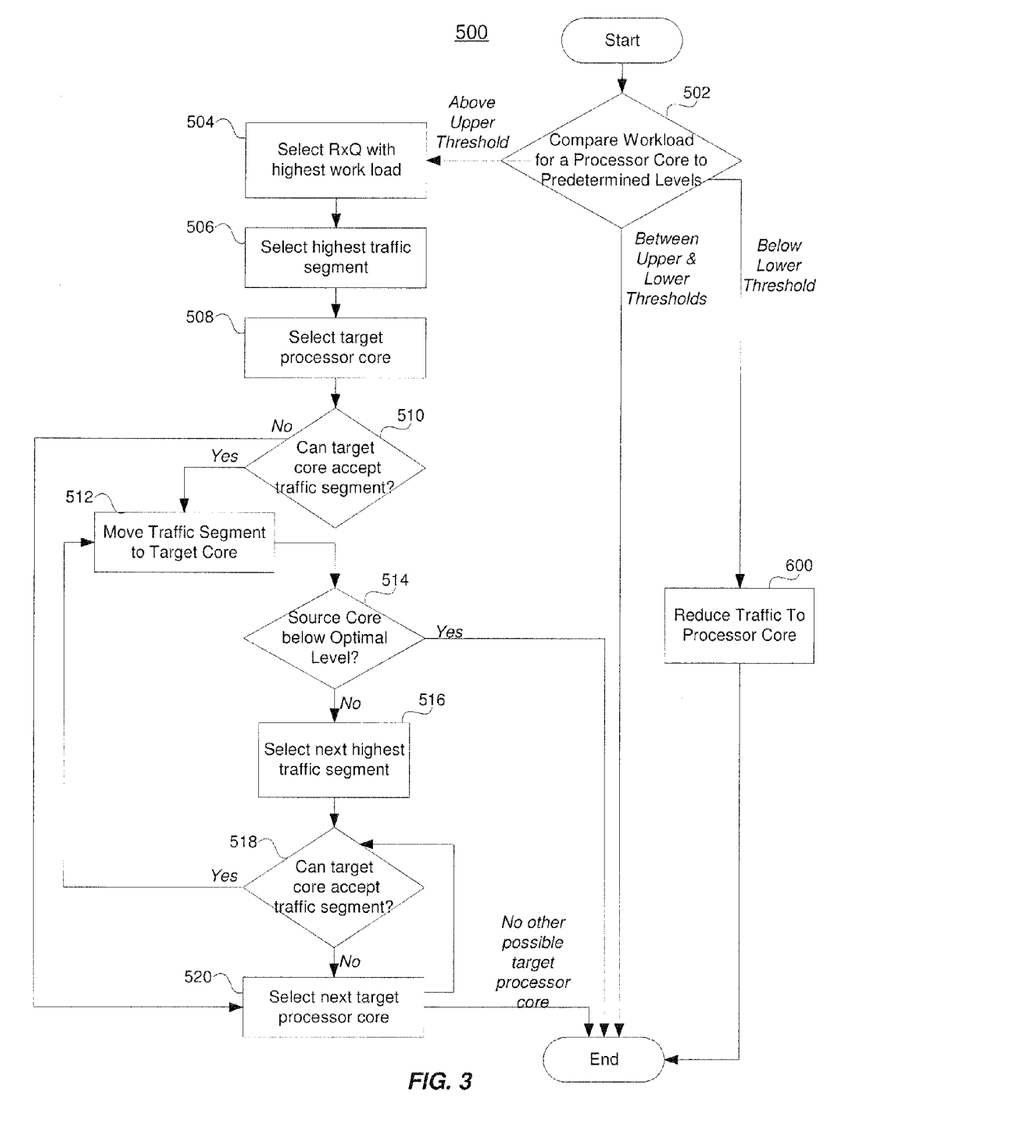
FIG. 3 shows an exemplary method for rebalancing processor core workload across a plurality of processor cores in a multi-core processing environment.

FIG. 3 illustrates an exemplary method 500 for rebalancing workload of a source processor core across a plurality of processor cores in a multi-core processing environment. The source processor core serves a source from which Traffic Segments may be moved. The method 500 may select any processor core as the source processor core. Typically, the source processor core is the processor core that triggered the optimization threshold in step 440. In an alternative embodiment, the method 500 may select the processor core that has the highest processing load as the source processor core. In one exemplary embodiment, the method 500 may first arrange all of the plurality of processor cores in order of processing load, for example, from highest load to lowest load, and subsequently select the highest loaded processor core as the source processor core. In other embodiments, the method 500 may select the processor core that has the least processing load as the source processor core.

In step 502, the method of 500 compares the processing activity of the source processor core to predetermined threshold levels. The processing activity, and specifically, the processing load, of the source processor core is compared to an upper threshold value and a lower threshold value. The upper threshold value (also referred as the "Black Watermark") corresponds to an excessively high level of processing load. The lower threshold value (also referred as the "White Watermark") corresponds to an excessively low level of processing load. The upper and lower threshold values may be set by an operator or may be predetermined by the system 10 or each processor core. For example, the upper threshold value may be at 90%, 85%, or 80% of the total processing capabilities of the processor core. The lower threshold value may be, for example, at 1%, 3%, or 5% of the total processing capabilities of the processor core. In some embodiments, the Black, Red and White Watermarks may be consistent across all of the processor cores within system 10, i.e., all of the processors cores share the same threshold values for the Black Red and White Watermarks. In other embodiments, the Black, Red and White Watermarks may be configured individually for each processor core. For example, if one processor core is assigned to perform a different task other than an in parallel to data packet processing, then its Black, Red and White Watermarks may be set to a considerably lower thresholds than other processor cores within the system 10.

If the processing load of the source processor core exceeds the upper threshold value ("Black Watermark"), method 500 will attempt to reduce the processing load from the source processor core. The method 500 may be performed by the source processor core, or any other processor core within the system 10, such as, for example, a processor core within the system 10 having the lowest processing load. In particular, rebalancing of excessive load from a processor core that exceed the Black Watermark may be performed by the overloaded processor core itself, but, as an alternative approach, may also be perform by another processing core within the system 10, which can detect the excessive load being processed by overloaded processor core, and reassigns Traffic Segments away from the overloaded processor core to other, less loaded processor cores. This alternative approach would have the benefit that the source processor core does not have to exert additional processing capacity on rebalancing when it is already overloaded. This approach can also ensure that there will be no rebalancing clashes, and that only one source processor core would be rebalanced at a time. This is particularly important because it is desirable that only a single processor core would send packets to the transitional queues (discussed below) during the transition period.

Specifically, the method 500 proceeds to step 504 and selects a source RxQ from which Traffic Segments may be moved. Typically, the source RxQ is a RxQ associated with the source processor core. In one embodiment, the method 500 selects the RxQ with the highest processing load associated with the source processor core as the source RxQ. It should be noted that a dependency between the RxQ identities and the rebalancing method 500 is not required.

In step 506, the method 500 selects one or more source Traffic Segments from the source RxQ for rebalancing. Any Traffic Segment on the source RxQ may be selected as a source Traffic Segment. In particular, the method 500 selects a Traffic Segment on the source RxQ with the highest processing load as a source Traffic Segment. In step 508, the method 500 selects one or more target processor cores to which the source Traffic Segments may be moved. The method 500 may select any processor core, other than the source processor core, as the target processor cores. In one embodiment, the method 500 may select the processor core that has the lowest processing load as a target processor core. The method 500 may also select an inactive processor core as the target processor core. The inactive processor core may be reactivated so as to permit it to receive the source Target Segment. In other embodiments, the source processor core may have the lowest processing load. In that case, the method 500 may select the processor core that has the second lowest processing load as a target processor core. In a further embodiment, the target processor core may already process data having some additional contextual relationship with the source Traffic Segment.

In step 510, the method 500 evaluates whether the selected target processor core is capable of receiving the source Traffic Segment without increasing the processing load of the target processor core to exceed a predetermined optimal level (also referred to herein as the "Red Watermark"). The optimal level ("Red Watermark") may be set by an operator or may be predetermined by the system 10 or each processor core. For example, the optimal level ("Red Watermark") may be at 80%, 75%, or 70% of the total processing capacity of the processor core. If the load of the target processor core, with the addition of the source Traffic Segment, does not exceed the predetermined optimal level ("Red Watermark"), then the source Traffic Segment is moved to an RxQ that is processed by the target processor core (step 512). If the predicted load of the target processor core, with the addition of the source Traffic Segment, exceeds the predetermined optimal level ("Red Watermark"), the method 500 attempts to find an alternative target processor core (step 520).

In step 512, the source Traffic Segment is moved from being processed by the source processor core to being processed by the target processor core. In particular, the source Traffic Segment may be transferred from the source RxQ to a target RxQ, the target RxQ being an RxQ associated with the target processor core. More particularly, the target RxQ receives data packets belonging to Traffic Segments from the same NIC as the source RxQ. That is, Traffic Segments originating from a particular NIC may be transferred from being processed by the source processor core to being processed by the target processor core. For example, Traffic Segments from RxQ 312 may be moved to processor core 120 by changing the mapping of the data in the NIC from RxQ 312 to RxQ 314. As another example, Traffic Segments from RxQ 322 may be moved to processor core 130 by changing the mapping of the data in the NIC from RxQ 322 to RxQ 326. As a further example, Traffic Segments from RxQ 334 may be moved to processor core 110 by changing the mapping of the data in the NIC from RxQ 334 to RxQ 332.

In an alternative embodiment, step 512 records the source Traffic Segment to be transferred and the target RxQ for receiving the source Traffic Segment. For each iteration of step 512, the selected source Traffic Segment and selected target RxQ are recorded and stored in a computer readable medium, but reconfiguration of the NICs are not implemented until all of the rebalancing calculations are complete. In this particular embodiment, all of the selected source Traffic Segments are moved to their designated target RxQs upon termination of method 500. The counter may also be updated after all of the selected source Traffic Segments are moved to their designated target RxQs. Specifically, the counter may be reset (e.g., set to zero). The counter may also be updated with a time stamp for the termination of method 500.

In an exemplary embodiment, a source processor core may attempt to relieve its own workload by reassigning source Traffic Segments from itself to other processor cores. Step 506 selects which Traffic Segments to reassign and steps 508 and 510 selects to which target processor cores. The reassignment may be implemented by reconfiguring all of the NICs in the system 10 to redirect the source Traffic Segments to its target RxQ. When Traffic Segments are reassigned, the new mapping must be re-configured on all NICs, for all data flows. In a particular embodiment, all of the reassignments are first calculated before the NICs are reconfigured. This new configuration will result in data packets belonging to a reassigned traffic segment, which would have previously been mapped to an RxQ that was processed by the source processor core, to be mapped to a different RxQ and consequently be handled by a different processor core.

In one exemplary embodiment, step 512 may generate instructions that redirects the Traffic Segment from the source RxQ to the target RxQ. For example, the source processor core may modify the RSS method such that new data packets from the source Traffic Segment are not directed to the source RxQ anymore, and are directed to the target RxQ instead. It is understood that such redirection of data packets may not occur seamlessly and that residual data packets may still be directed to the source RxQ during a transitional period while new data packets are sent to the target RxQ. In one particular embodiment, each processor core is further associated with a transitional Worker module and a transitional queue to accommodate this transitional period. Specifically, the residual data packets sent to the source RxQ during the transitional period may be received by the transitional queue and processed by the transitional Worker module. The transitional Worker module ensures that the residual data packets within the transitional queue are processed before the target processor core processes new data packets belonging to the source Traffic Segment that arrive on the target RxQ. The optimization counter may also be updated by step 512 after the source Traffic Segment is moved to the target RxQ. Specifically, the counter may be reset (e.g., set to zero). The counter may also be updated with a time stamp for step 512.

In step 514, the method 500 evaluates whether the reduced processing load (i.e., processing load after removal of the source Traffic Segment from the source processor core) of the source processor core is at or below the predetermined optimal level ("Red Watermark"). In embodiments where the selected source Traffic Segments and selected target RxQs are recorded and stored in a computer readable medium and reconfiguration of the NICs are not implemented until all of the rebalancing calculations are complete, step 514 is evaluated based on predicted reduced processing loads of the source processor core. If the reduced processing load or predicted reduced processing load is at or below the predetermined optimal level ("Red Watermark"), method 500 ends for the source processor core. If removal of the source Traffic Segment from the source processor core does not achieve a load that is at or below the predetermined optimal level ("Red Watermark"), then a next source Traffic Segment is selected for rebalancing. Although any remaining Traffic Segment on the source RxQ may be selected as the next source Traffic Segment, the method 500, may select the remaining Traffic Segment on the source RxQ with the highest processing load as the next source Traffic Segment for rebalancing (step 516). If there are no other Traffic Segments remaining on the source RxQ, step 516 may select a Traffic Segment from another RxQ processed by the same processing core, or alternatively, the next highest loaded RxQ. It is noted that the method 500 may iteratively select Traffic Segments for rebalancing, or alternatively, may rebalance all of the Traffic Segments using integer linear programming optimization methods, such as Branch-and-Cut methods. While method 500 provides an exemplary embodiment of a workload optimization process using RxQs, it is contemplated that an alternative embodiment of a suitable workload optimization process may reassign traffic segments in a similar manner as described in method 500, without requiring reference to RxQs.

Similar to step 510, step 518 evaluates whether the selected target processor core is capable of receiving the next source Traffic Segment without increasing the processing load of the target processor core to exceed the predetermined optimal level ("Red Watermark"). If predicted load of the target processor core, with the addition of the next source Traffic Segment, exceeds the predetermined optimal level ("Red Watermark"), the method 500 proceeds to step 520 to select a new target processor core. Step 520 may select any other processor core as the new target processor core, including inactive processor cores that may be reactivated so as to permit it to receive the source Traffic Segment. For example, if no active processor core has enough processing capacity to accommodate for the excess traffic segments, and the system 10 includes one or more processor cores that are currently inactive but available for reactivation, then the system 10 (e.g., the source processor core, or any other processor core that is conducting the rebalancing) may signal to the inactive processor core and reactivate it to receive and process the source Traffic Segment. In one embodiment, the step 520 may select the processor core with the next lowest processing load as the new target processor core. If the load of the new target processor core, with the addition of the next source Traffic Segment, does not exceed the predetermined optimal level ("Red Watermark"), then the next source Traffic Segment is moved to an RxQ that is processed by the new target processor core (step 512). The method 500 subsequently returns to step 514 and continues as set forth above. Steps 512-514 are repeated in the manner described above and shown in FIG. 3 until the source processor core reaches a processing load below the predetermined optimal level ("Red Watermark").

If the predicted load of the new target processor core, with the addition of the source Traffic Segment, exceeds the predetermined optimal level ("Red Watermark"), the method 500 returns to step 520 to select an alternate processor core as the new target processor core. In particular, step 520 selects an alternate processor core that had not been previously considered as a potential target processor core for receiving the source Traffic Segment. However, if no other possible target processor core remains (including any inactive processors cores that may potentially be reactivated to relieve workload), the method 500 ends for the source processor core. In an alternative embodiment, the source processor core may proceed with reassigning some of its traffic segments to target processor cores without them reaching their Red Watermark, even though the source processor core does not drop its own load below its Red Watermark, thereby relieving at least some of its excessive workload.

Figure 4:
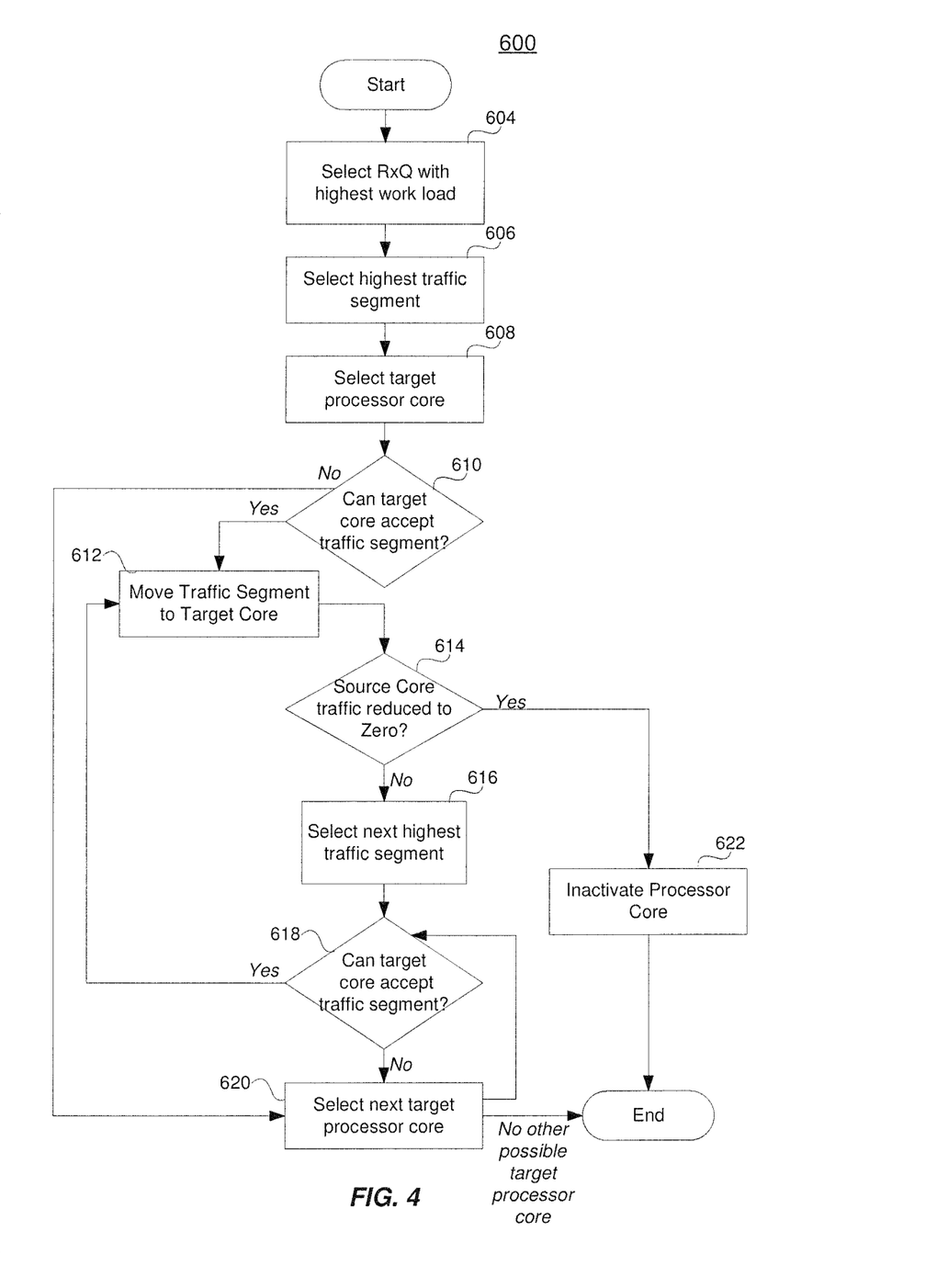
FIG. 4 shows an exemplary method for diverting workload away from a processor core to minimize the number of processor cores active in a multi-core processing environment.

Returning to step 502, if the processing load of the source processor core is below the lower threshold value, the method 500 will attempt to divert Traffic Segments away from the source processor core and inactivate the source processor core (method 600). FIG. 4 shows an exemplary method 600 for diverting workload away from a processor core to minimize the number of processor cores active in a multi-core processing environment.

In an alternative embodiment, the method 500 may select source Traffic Segments and one or more target processor cores to which the source Traffic Segments may be moved by utilizing integer linear programming optimization methods, such as Branch-and-Cut methods. In order to achieve this, in one particular exemplary embodiment, steps 504-520 may be replaced by the exemplary method 700 shown in FIG. 5 (described further below). These methods may be used to identify optimal mapping between source Traffic Segments and target processing cores so that the number of reassigned Traffic Segments, and consequently, the amount of residual data packets caused by the transferring of Traffic Segments to target RxQs, would be minimal.

Figure 5:
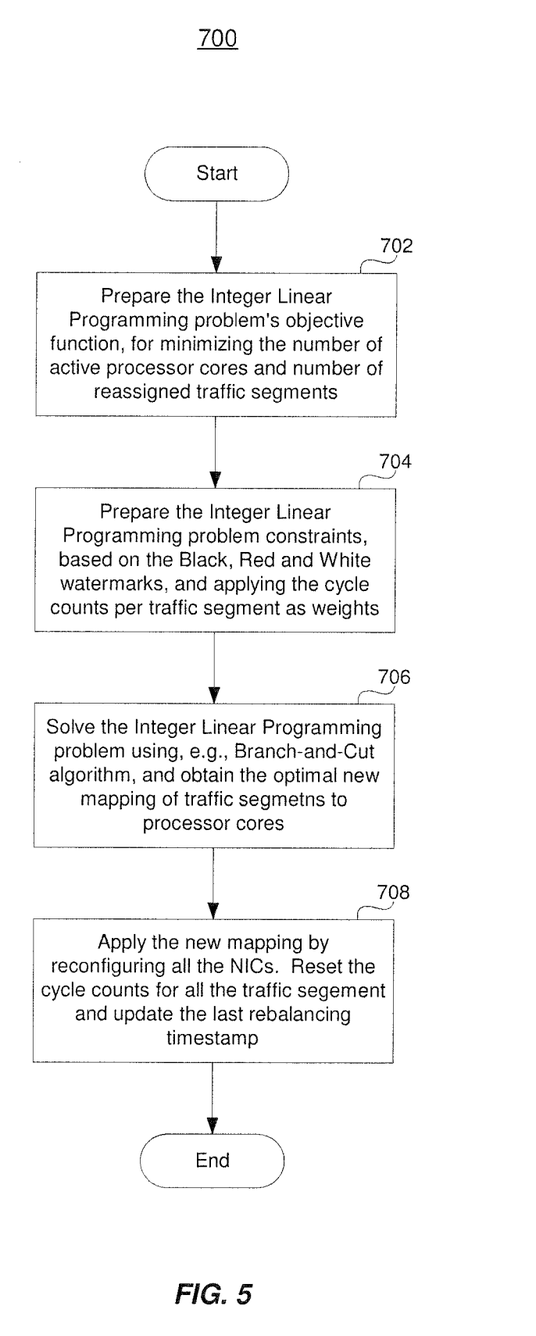
FIG. 5 shows an alternative exemplary method for rebalancing processor core workload across a plurality of processor cores in a multi-core processing environment.

As shown in FIG. 5, method 700 provides an alternative method for rebalancing processor core workload across a plurality of processor cores in a multi-core processing environment using integer linear programming optimization methods. This alternative method may be embodied in one or more integer linear programming problem programs and functions. In step 702, the method 700 prepares an objective function for an integer linear programming optimization method, for minimizing the number of active processor cores and number of reassigned Traffic Segments. After the objective function has been prepare, the method 700 proceeds to step 704 and prepares constraints to the integer linear programming optimization method. In particular, the constraints may be based on the Black, Red and White watermarks. The method 700 may also apply cycle counts per Traffic Segments as weights to the integer linear programming optimization method. In step 706, once the constraints have been set, the method 700 proceeds to solve for optimized solutions. For example, the method 700 utilize a Branch-and-Cut method to generate at least one optimized solution for reconfiguring processor core workload. In particularly, step 706 may provide an optimal new mapping of traffic segments across the plurality of processor cores in the system. Subsequently, in step 708, method 700 implements and applies the new mapping by reconfiguring all of the NICs in the system to reassign Traffic Segments according to the new mapping. Step 708 may further include resetting the counters for all of the traffic segments and/or updating the last rebalancing time stamp.

Steps 604-612 are substantially similar to steps 504-512 described above. However, instead of focusing on a predetermined optimal level ("Red Watermark"), step 614 evaluates whether the processing load of the source processor core has been reduced to zero. If removal of the source Traffic Segment from the source processor core reduces the load to zero, the method 600 may inactivate the source processor core (step 622). As would be understood by those skilled in the art the processor core may be inactivated by shutting down, suspending or otherwise isolating the unused processor core. In some embodiments the inactivated processor cores may be diverted to perform data processing for other systems, processes and/or applications. Step 622 optimizes system performance by isolating unused processor cores, and thereby reducing power usage and/or making available computing resources for more efficient use. In an alternative embodiment, steps 604-620 may be replaced by the method 700, which would attempt to find an optimal remapping of traffic segments to processor cores, while applying constraints that exclude the source processor core from the new mapping.

If the processing load of the source processor core is between the upper and lower threshold values (i.e., between the "Black watermark" and the "White watermark"), the method 500 ends and does not rebalance the source processor core.

Those skilled in the art will understand that the methods and systems of the exemplary embodiments provide for flexible workload distribution in a multi-core processing environment and thus, good system-wide performance. Good system-wide performance may be characterized, for example, by minimal processing delay of data packets through the system (given that, except for a minimal number of residual data packets, every data packet goes through a single processor core). Another characteristic is minimal jitter, i.e., minimal variance in the data packet delay (given that the majority of data packets go through a similar path through the system, i.e., NIC-to-RxQ-to-processor core). Also, the throughput-per-core of the system will be higher, since the processing capacity of the processor cores is utilized better (eliminating e.g., a common scenario where one processor core is fully utilized while another processor core is idle). Another aspect is the linearity of the system, namely the ability of the system to process twice as much traffic with two active processor cores vs. the amount of traffic that can be processed with a single processor core, and similarly with three processor cores, four processor cores and so on. The methods and systems of the exemplary embodiments minimize the number of processor cores used for a particular workload, while maintaining the workload on each processor core below a predetermined threshold maximum level, typically at a desired optimal level. Because the exemplary embodiments achieve the optimal number of processor cores dynamically and with marginal overhead, it provides a robust benchmark for establishing the load-per-core criteria in deployed systems, and allows users to estimate their scaling needs based on network demands.

Those skilled in the art will understand that the above-described exemplary embodiments may be utilized to distribute and optimize data packet traffic processing in any form and is not limited to packet traffic from physical portals, but may include any type of data traffic flows that may be processed by a plurality of computing resources, for example, the data traffic flows may include data traffic received by packet processing modules, co-located processing modules, and/or operating systems. In addition, the exemplary embodiments may be used alone or in combination with third-party applications that provides separate methods for workload optimization, the combination of which provide for a more robust system and further system-wide load-balancing benefits.

Those skilled in the art will understand that the above-described exemplary embodiments may be implemented in any number of manners, including as a separate software module, as a combination of hardware and software, etc. For example, the exemplary methods 400, 500, 600, 700 may be embodiment in one or more programs stored in a non-transitory storage medium and containing lines of code that, when compiled, may be executed by at least one of the plurality of processor cores or a separate processor.

The exemplary embodiments described and claimed herein is not to be limited in scope by the specific embodiments herein disclosed since these embodiments are intended as illustrations. Any equivalent embodiments are intended to be within the scope of this application. Indeed, various modifications in addition to those shown and described herein will become apparent to those skilled in the art from the foregoing description. Such modifications are also intended to fall within the scope of the appended claims. All publications cited herein are incorporated by reference in their entirety.

What is claimed is:

1. A method for dynamically rebalancing packet traffic workloads in a multi-core computing system, the system comprising a first processor core and a second processor core, the method comprising:
   selecting a first traffic segment assigned to be processed by the first processor core, the first processor core having a first initial workload, wherein the first traffic segment is one of a plurality of traffic segments assigned to the first processor core and wherein the plurality of traffic segments are subsets of incoming data traffic;

reassigning the first traffic segment so that the first traffic segment will be processed by the second processor core if an increased workload of the second processor core upon receipt of the first traffic segment will not exceed a first workload level; and determining, after reassigning the first traffic segment, whether a reduced workload of the first processor core is above, at or below a second workload level, after reassigning the first traffic segment, when the determined reduced workload is above the second workload level, selecting a second traffic segment assigned to be processed by the first processor core, wherein the second traffic segment is one of the plurality of traffic segments assigned to the first processor core and repeating the reassigning and determining steps for the second traffic segment.

2. The method of claim 1, wherein the first initial workload is above an upper threshold value corresponding to an excessively high processing load.

3. The method of claim 1, wherein the first and second workload levels both correspond to an optimal workload level.

4. The method of claim 1, wherein the first initial workload is below a lower threshold value corresponding to an excessively low processing load.

5. The method of claim 4, wherein the first workload level is an optimal workload level, and the second workload level is zero.

6. The method of claim 5, further comprising the step of inactivating the first processor core if the reduced workload is at zero.

7. The method of claim 1, wherein the incoming data traffic comprises a plurality of data packets.

8. The method of claim 1, wherein the selecting a first traffic segment assigned to be processed by the first processor core is performed by a further processor core.

9. A system comprising:
a first processor core that includes a first plurality of receiving queues;
a second processor core that includes a second plurality of receiving queues; and
a network interface controller (NIC) that receives incoming data traffic, generates a plurality of traffic segments based on the incoming data traffic and assigns a first traffic segment of the plurality of traffic segments to be processed by the first processor core,
wherein the first processor core is associated with a first initial workload that includes the first traffic segment,
wherein the first processor core reassigns the first traffic segment to the second processor core so that the first traffic segment will processed by the second processor core if an increased workload of the second processor core upon receipt of the first traffic segment will not exceed a first workload level,
wherein the first processor core determines, after reassigning the first traffic segment, whether a reduced workload of the first processor core is above, at or below a second workload level, and
wherein after reassigning the first traffic segment, when the determined reduced workload above the second workload level, the first processor core selects a second traffic segment of the plurality of traffic segments assigned to be processed by the first processor core and repeats the reassigning and determining steps for the second processor core.

10. The system of claim 9, wherein prior to being reassigned to the second processor core the first traffic segment is included in one of the first plurality of receiving queues and wherein the first traffic segment is reassigned based on being included in the one of the first plurality of receiving queues.

11. The system of claim 10, wherein the one of the first plurality of receiving queues is associated with the highest processing load among the first plurality of receiving queues.

12. The system of claim 9, further comprising:
a further processor core,
wherein reassigning the first traffic segment to the second processor core is based on a comparison of a second initial workload associated with the second processor core and a further initial workload associated with the further processor core.

13. The system of claim 9, wherein reassigning the second traffic segment to the second processor core includes comparing a second initial workload associated with the second processor core to a predetermined workload threshold.

14. The system of claim 9, wherein reassigning the second traffic segment to the second processor core generates a further reduced workload associated with the first processor core.

15. The system of claim 14, further comprising:
a further processor core,
wherein if after reassigning the second traffic segment to the second processor core the further reduced workload is above a first predetermined workload threshold a third traffic segment that is part of the plurality of traffic segments and is assigned to be processed by the first processor core is reassigned to the further processor core so that the third traffic segment will be processed by the further processor core.

16. A non-transitory computer readable storage medium storing a set of instructions executable by a processor, the set of instructions, when executed by the processor, causing the processor to perform operations comprising:
selecting a first traffic segment assigned to be processed by the first processor core, the first processor core having a first initial workload, wherein the first traffic segment is one of a plurality of traffic segments assigned to the first processor core and wherein the plurality of traffic segments are subsets of incoming data traffic;
reassigning the first traffic segment so that the first traffic segment will be processed by the second processor core if an increased workload of the second processor core upon receipt of the first traffic segment will not exceed a first workload level; and
determining, after reassigning the first traffic segment, whether a reduced workload of the first processor core is above, at or below a second workload level,
after reassigning the first traffic segment, when the determined reduced workload level is above the second workload level, selecting a second traffic segment assigned to be processed by the first processor core, wherein the second traffic segment is one of the plurality of traffic segments assigned to the first processor core and repeating the reassigning and determining steps for the second traffic segment.

* * * * *

UNITED STATES PATENT AND TRADEMARK OFFICE
CERTIFICATE OF CORRECTION

PATENT NO. : 9,917,777 B2
APPLICATION NO. : 14/597829
DATED : March 13, 2018
INVENTOR(S) : Buchnik et al.

Page 1 of 1

It is certified that error appears in the above-identified patent and that said Letters Patent is hereby corrected as shown below:

On the Title Page

Item (72), third inventor's name should be included as follows:
"Erez Buchnik", "Jeff Mandin" should read "Erez Buchnik", "Jeff Mandin" and "Rami Neiman"

Signed and Sealed this
Twenty-eighth Day of May, 2019

Andrei Iancu
*Director of the United States Patent and Trademark Office*